United States Patent [19]

Hoppough

[11] 4,022,989

[45] May 10, 1977

[54] TELEPHONE RECEIVER-OFF-HOOK-AND-IN-USE DETECTOR

[75] Inventor: Richard Scott Hoppough, Greensboro, N.C.

[73] Assignee: Bell Telephone Laboratories, Incorporated, Murray Hill, N.J.

[22] Filed: June 28, 1976

[21] Appl. No.: 700,293

[52] U.S. Cl. .................... 179/175.2 C; 179/1 VC; 179/18 AB; 179/1 MN
[51] Int. Cl.² ........................................ H04M 3/22
[58] Field of Search ........... 179/1 MN, 1 SA, 1 SB, 179/1 VC

[56] References Cited

UNITED STATES PATENTS

| 3,448,215 | 6/1969 | Engel | 179/1 VC |
| 3,873,772 | 3/1975 | Dumler | 179/1 VC X |
| 3,972,603 | 8/1976 | Lubinec | 179/1 VC X |

*Primary Examiner*—William C. Cooper
*Attorney, Agent, or Firm*—H. L. Logan

[57] ABSTRACT

A telephone line reported by a subscriber to be busy may be checked by the disclosed apparatus to determine if the telephone is actually in use or merely appears busy because of leakage in the telephone line or of the receiver being accidentally off-hook. When the telephone is actually in use, peaks in signals present on the line are counted and cause an in-use indication. When an accidentally off-hook or leakage condition is present, particular signals on the line or the absence of signals cause a not-in-use indication.

5 Claims, 1 Drawing Figure

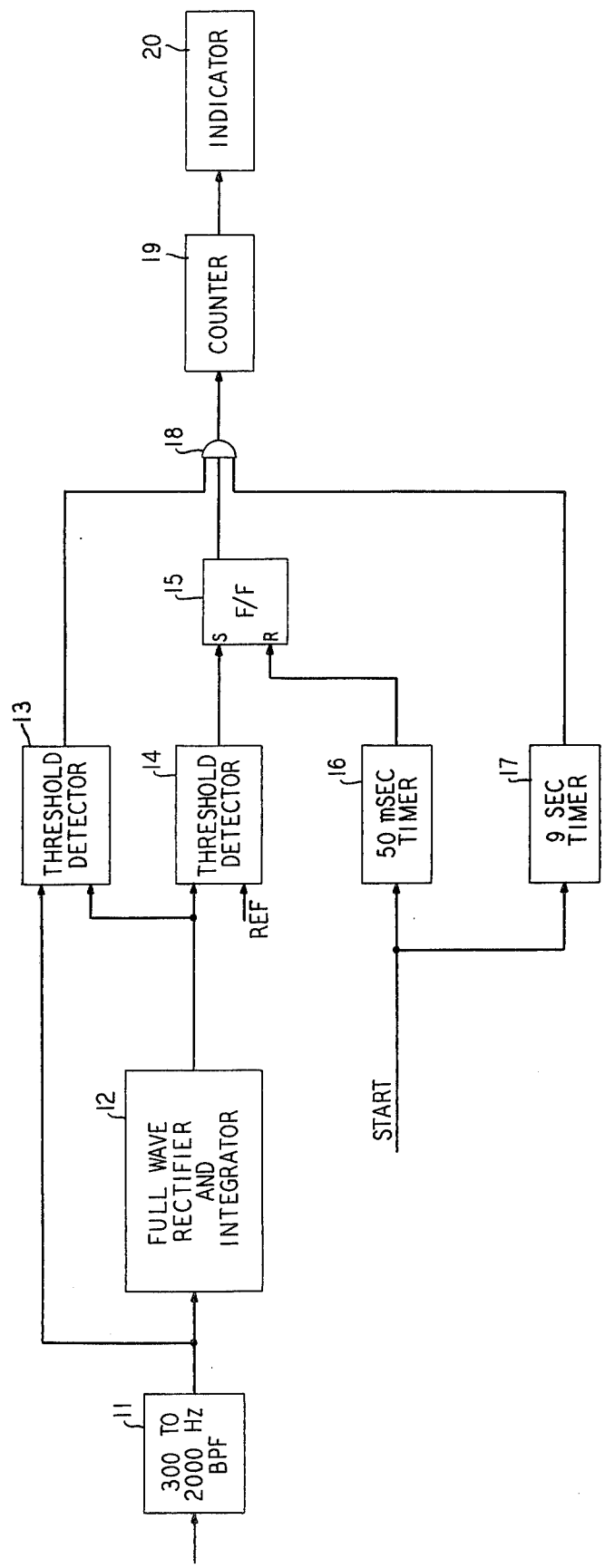

TELEPHONE RECEIVER-OFF-HOOK-AND-IN-USE DETECTOR

BACKGROUND OF THE INVENTION

1. Field of the Invention

This invention relates to determining, from a telephone central office, whether or not a telephone is in used by a subscriber.

2. Description of the Prior Art

A frequent telephone problem is where a first subscriber reports repeated busy signals when trying to reach a second subscriber. Assuming the first subscriber has dialed correctly, busy signals may be produced by a leakage path between the second subscriber's telephone line conductors or by the second subscriber's telephone being in a receiver-off-hook-and-in-use condition or in a receiver-off-hook-and-not-in-use condition.

Heretofore, it has been a common practice to identify the cause of the problem by an operator or craftsperson gaining access to the line in question and listening. When any one of a number of signals is heard, an in-use condition exists. Such signals include TOUCH-TONE or rotary dialing signals (indicating that the second subscriber is signaling), a busy signal (indicating that the second subscriber has dialed and is receiving a busy signal), ringing signals (indicating that the second subscriber has dialed and that a called party's phone is ringing) and, of course, speech signals.

On the other hand, when a dial tone is heard, it is known that a receiver is off-hook and not in use (i.e., dialing not attempted). Furthermore, a holding trunk tone indicates either a line short or a receiver off-hook and no-dialing-attempted condition. Still further, a dead or quiet line indicates a low impedance short across the line conductors while a noise "signal" indicates a higher impedance leakage path across the line conductors.

The above-described testing procedure requires what is considered to be an unreasonable length of time for testing, possible ambiguity with respect to the results produced and, furthermore, possible interference with a customer's conversation. In an effort to circumvent these undersirable characteristics, consideration has been given to automating the entire test procedure.

SUMMARY OF THE INVENTION

An object of the present invention is to rapidly determine, from a telephone central office, whether or not a subscriber's telephone is in use.

The present invention achieves this and other objects by taking advantage of the fact that an in-use condition is indicated by the various noncontinuous signals identified above while a not-in-use condition or a leakage condition is indicated by either continuous signals or non-signals. In particular, embodiments of the invention count, in such signals, peaks which exceed a threshold set at a value in excess of $\sqrt{2}$ times the rms value of the signals. When a signal on a line in question is a noncontinuous one — as, for example, a voice or speech signal — the irregular nature of the signal, and in particular the breaks or pauses therein, result in a rms value which is considerably less than the peaks in the signal divided by $\sqrt{2}$. When a peak count in excess of a particular value occurs within a predetermined time interval, the line is identified as one in use. On the other hand, a continuous signal — such as a dial tone — will not have peaks in excess of $\sqrt{2}$ times its rms value and consequently no peaks are counted.

Spurious noise signals riding on continuous signals produce a count which in general is insufficient to indicate an in-use line. However, excess spurious noise signals can produce a count indicative of an in-use condition. Furthermore, a false indication may be produced in the situation where a telephone receiver has been accidentally knocked off-hook, a dial tone is on the line but background noise or voices in the vicinity of the receiver impose a noncontinuous signal on the continuous signal. In accordance with the invention, these situations are prevented from giving false in-use indications by preventing counting as long as the rms value remains above a predetermined threshold level. Stated in another manner, counting is initiated and continues only after the rms value has fallen momentarily below a threshold level, thus indicating the absence of a continuous signal.

BRIEF DESCRIPTION OF THE DRAWING

The sole FIGURE in the drawing is a block diagram of apparatus embodying the invention.

DETAILED DESCRIPTION OF APPARATUS EMBODYING THE INVENTION

The apparatus shown in the drawing has a 300 to 2000 Hz bandpass filter 11 connected in its input circuit. The purpose of this filter is to attenuate both 60 Hz and over 2000 Hz waves which may be on a subscriber's line. This assures a more reliable operation of the apparatus. When, of course, such waves are not anticipated as being potential problems, filter 11 may be eliminated.

The output of filter 11 is applied to a full wave rectifier and integrator 12 which produces the rms value of the signals applied to its input terminals. A time constant of about 30 msec for the integrator portion of this circuit has produced good results.

The outputs of filter 11 and rectifier and integrator 12 are applied to a threshold detector 13. Detector 13 responds to the rms output of rectifier and integrator 12 to control the detector's threshold level. In particular, it controls the threshold level so that it is just sufficient to prevent the detector from producing an output when a continuous sine-wave signal is applied to the apparatus. In practice, satisfactory operation has been achieved when rectifier and integrator 12 and threshold detector 13 function to produce an output from detector 13 only when a signal applied by filter 11 has a peak which exceeds approximtely 1.5 times the rms value of the signal.

The apparatus also includes a threshold detector 14 which receives an input reference voltage and the output of rectifier and integrator 12. Detector 14 produces an output each time the output of rectifier and integrator 12 falls below the level of the input reference voltage. An output is not produced, therefore, as long as a continuous tone signal is present; this is true notwithstanding the presence of voice signals on such a tone signal.

The output of detector 14 is applied to the SET input of a flip-flop 15. The RESET input of flip-flop 15 is connected to a 50 millisecond timer 16 which resets the flip-flop in response to a start signal. When flip-flop 15 is placed in a SET state by an output from detector 14, the flip-flop produces an output — until RESET — which indicates that detector 14 has recognized that a continuous tone signal is not present.

The same start signal which starts timer 16 also starts a nine second timer 17. During that nine second interval, an output is applied to one input terminal of an AND gate 18. Two other input terminals of AND gate 18 are connected to detector 13 and flip-flop 15, respectively. AND gate 18 can produce outputs, therefore, only during the nine second interval. AND gate 18 is connected to a counter 19 which, in turn, is connected to an indicator 20.

In summary, rectifier and integrator 12 and threshold detector 13 function to produce an output each time a signal applied to these circuits has a peak in excess of $\sqrt{2}$ times the rms value of the signal. Timer 16 assures that flip-flop 15 is in a reset condition at the beginning of each test cycle. Timer 17 determines the interval to be tested. Threshold detector 14 and flip-flop 15 permit the outputs of detector 13 to be counted only when a continuous tone signal is not present; that is, although detector 13 produces outputs when spurious noise peaks or voice signals are present, these outputs are not counted as long as a continuous tone signal is also present.

The operation of the apparatus in response to various signals encountered while testing a telephone customer's line may be summarized as follows:

1. Noncontinuous signals such as speech, dialing, busy and ringing signals, with no continuous tone signals present, cause detector 13 to produce outputs and detector 14 to produce at least one output to SET flip-flop 15. The outputs of detector 13 are then counted for the remainder of the nine second interval established by timer 17. A count in excess of a predetermined number produces an in-use indication.
2. Continuous tone signals, either alone or with speech or spurious noise imposed thereon, prevent detector 14 from producing an output so that a count cannot possibly be accumulated. A not-in-use indication is produced.
3. No signals present — i.e., a "quiet" line — fails to produce a count. A not-in-use indication is produced.
4. Spurious noise signals, in the absence of a continuous signal, produce a count less than the required predetermined number. A not-in-use indication is produced.

Experiments have demonstrated that in some instances counting reliability is improved by further frequency restricting signals applied to detector 13. In particular, an 800 Hz high-pass filter placed in the ac lead to detector 13 has improved reliability. When inserting such a filter, however, this portion of the apparatus must be readjusted so that threshold detector 13 continues to just fail to produce outputs for continuous tone input signals.

What is claimed is:

1. A combination for detecting speech signals on a transmission line, said combination comprising
   first means for connection to said line for producing an output each time a peak in a signal exceeds a threshold level in excess of $\sqrt{2}$ times the rms value of said signal, and
   second means connected to said first means for counting said outputs.
2. A combination in accordance with claim 1 which further comprises
   third means connected between said first and second means to enable said second means to count said outputs over a predetermined interval only after said rms value of said signal falls below a predetermined level.
3. A combination for connection to a transmission line for detecting speech signals on said line, said combination comprising
   input terminals,
   first means connected to said input terminals for producing an output each time a peak in an input signal exceeds a threshold level in excess of $\sqrt{2}$ times the rms value of said signal,
   second means connected to said first means for producing an output for a predetermined interval each time said rms value falls below a predetermined level, and
   third means connected to said first and second means to count said first means outputs only when said second means output is present.
4. A combination for connection to a transmission line for detecting speech signals on said line, said combination comprising
   input terminals,
   first means for producing a dc voltage whose magnitude is related to the rms value of signals applied thereto,
   second means connecting said first means to said input terminals,
   third means for producing an output each time an input signal applied thereto exceeds a controllable threshold level,
   fourth means connecting said third means to both said input terminals and said first means to control said threshold level in response to said first means dc voltage so that said threshold level is just sufficient to prevent said outputs when only continuous sine-wave signals are applied to said input terminals, and
   fifth means connected to said third means for counting said outputs over a predetermined interval.
5. A combination in accordance with claim 4 which further comprises
   sixth means connected between said first and fifth means and responsive to said magnitude of said dc voltage falling below a predetermined level to enable said fifth means to count said outputs for a predetermined time interval.

* * * * *

UNITED STATES PATENT AND TRADEMARK OFFICE
CERTIFICATE OF CORRECTION

PATENT NO. : 4,022,989
DATED : May 10, 1977
INVENTOR(S) : Richard S. Hoppough

It is certified that error appears in the above-identified patent and that said Letters Patent are hereby corrected as shown below:

Column 3, line 15, beginning of line,

"2" should read -- $\sqrt{2}$ --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks